US009095829B2

(12) United States Patent
Gorodetsky et al.

(10) Patent No.: US 9,095,829 B2
(45) Date of Patent: Aug. 4, 2015

(54) PLASMA FIRED FEED NOZZLE

(75) Inventors: Aleksandr Gorodetsky, Calgary (CA); James Santoianni, Greensburg, PA (US); Aleksandre Kokourine, Mississauga (CA)

(73) Assignee: Alter NRG Corp., Calgary, Alberta (CA)

( * ) Notice: Subject to any disclaimer, the term of this patent is extended or adjusted under 35 U.S.C. 154(b) by 264 days.

(21) Appl. No.: 13/587,345

(22) Filed: Aug. 16, 2012

(65) Prior Publication Data

US 2014/0048516 A1 Feb. 20, 2014

(51) Int. Cl.
*B23K 10/00* (2006.01)
*B01J 4/00* (2006.01)
*H05H 1/34* (2006.01)

(52) U.S. Cl.
CPC .. *B01J 4/00* (2013.01); *H05H 1/341* (2013.01)

(58) Field of Classification Search
CPC .............. H05H 1/34; H05H 1/48; F23G 5/24; F27D 11/08; F27D 7/02
USPC ............. 219/121.51, 121.48, 121.36, 121.55, 219/383; 373/22, 118; 110/250; 588/900
See application file for complete search history.

(56) References Cited

U.S. PATENT DOCUMENTS

| | | | | |
|---|---|---|---|---|
| 4,530,101 | A | 7/1985 | Fey et al. | |
| 4,554,435 | A * | 11/1985 | Wolf et al. | 219/383 |
| 4,761,793 | A * | 8/1988 | Digne et al. | 373/24 |
| 5,220,150 | A | 6/1993 | Pfender et al. | |
| 5,662,266 | A | 9/1997 | Zurecki et al. | |
| 5,738,281 | A * | 4/1998 | Zurecki et al. | 239/290 |
| 5,965,039 | A * | 10/1999 | Kitahashi et al. | 219/121.5 |
| 7,017,390 | B1 | 3/2006 | Vogel | |
| 7,622,693 | B2 * | 11/2009 | Foret | 219/121.43 |
| 8,110,155 | B2 * | 2/2012 | Fridman et al. | 422/186.04 |
| 2003/0160033 | A1 * | 8/2003 | Johnson et al. | 219/121.51 |
| 2004/0170210 | A1 * | 9/2004 | Do et al. | 373/118 |
| 2010/0199560 | A1 | 8/2010 | Dighe et al. | |
| 2014/0144892 | A1 * | 5/2014 | Hussary et al. | 219/121.51 |

FOREIGN PATENT DOCUMENTS

| | | |
|---|---|---|
| GB | 1398824 | 6/1975 |
| WO | 2008070930 A1 | 6/2008 |

* cited by examiner

*Primary Examiner* — Mark Paschall

(74) *Attorney, Agent, or Firm* — Robert P. Lenart, Esq.; Pietragallo Gordon Alfano Bosick & Raspanti, LLP

(57) ABSTRACT

An apparatus includes a tuyere chamber, a plasma torch configured to produce a superheated gas and to direct the superheated gas into the tuyere chamber in an axial direction, and a shroud gas inlet assembly configured to direct a shroud gas into the tuyere chamber wherein one part of the shroud gas is injected coaxially with the super heated gas and a second part of the shroud gas is injected as a swirl shielding the tuyere walls.

20 Claims, 17 Drawing Sheets

392
388
10
384
386
390
376
380
382
378
372
370
374

78
80
86
84
82
88
76
90
92
10
70
94
72
74

90
98
96
70
74
80
88
84
82
72
76

PLASMA FIRED FEED NOZZLE

FIELD OF THE INVENTION

The invention relates to a plasma feed nozzle for a gasifier, furnace or other reactor vessel.

BACKGROUND

Plasma gasification reactors (sometimes referred to as PGRs) are a type of pyrolytic reactor known and used for treatment of any of a wide range of materials including, for example, scrap metal, hazardous waste, other municipal or industrial waste and landfill material, and vegetative waste or biomass to derive useful material, e.g., metals, or a synthesis gas (syngas), or to vitrify undesirable waste for easier disposition. In the present description "plasma gasification reactor" and "PGR" are intended to refer to reactors of the same general type whether applied for gasification or vitrification, or both. Unless the context indicates otherwise, terms such as "gasifier" or "gasification" used herein can be understood to apply alternatively or additionally to "vitrifier" or "vitrification", and vice versa.

PGRs and their various uses are described in, for example, U.S. Pat. No. 7,632,394 by Dighe et al., issued Dec. 15, 2009, entitled "System and Process for Upgrading Heavy Hydrocarbons"; U.S. Patent Application Publication No. 2009/0307974 by Dighe et al., entitled "System and Process for Reduction of Greenhouse Gas and Conversion of Biomass"; and U.S. Patent Application Publication No. 2010/0199557 by Dighe et al., entitled "Plasma Gasification Reactor", all of which are incorporated by reference herein for their descriptions of PGRs and methods practiced with them.

Heat from an electric arc can be fed into a cupola, furnace, or other reactor vessel to enhance the operation thereof by providing a very hot gas stream which may be either oxidizing or reducing and can also be mixed with particulate material. The electric arc can be produced in a plasma torch in which the electric arc ionizes the gas which is blown out of the end of the torch producing a hot gas stream which generally operates in the range of, for example, 10,000° F. or 5,538° C.

Heat from an electric arc can be relayed by means of superheated gas (plasma) to a gasifier or furnace. A feed nozzle, as described in U.S. Pat. No. 4,761,793 can be used to direct a large amount of thermal energy to a cupola or other furnace. The feed nozzle described in U.S. Pat. No. 4,530,101 is effective, but is limited in terms of functional length (i.e., the distance between the plasma torch from a coke bed in the gasifier or furnace is limited). To relay thermal energy from a plasma torch, a feed nozzle with a tubular or conical chamber can be used in conjunction with a shroud gas that separates the superheated gas flow from the walls of the chamber. It is desirable to ensure that the superheated gas flow remains axial in relation to the chamber length otherwise impingement of the superheated gas flow on the chamber wall can cause mechanical failure of the chamber wall. The chamber wall is typically water cooled and cast in a refractory. At longer lengths of this chamber, more energy is lost from the superheated gas flow to the water cooling of the chamber wall. This thermal loss to water cooling reduces the efficiency of the overall process.

SUMMARY

In one aspect, the invention provides an apparatus including a tuyere chamber, a plasma torch configured to produce a superheated gas and to direct the superheated gas into the tuyere chamber in an axial direction, and a shroud gas inlet assembly configured to direct a shroud gas into the tuyere chamber wherein one part of the shroud gas is injected coaxially with the super heated gas and a second part of the shroud gas is injected as a swirl shielding the tuyere walls.

In another aspect, the invention provides an apparatus including a tuyere chamber, a plasma torch configured to produce a superheated gas and to direct the superheated gas into the tuyere chamber in an axial direction, and a shroud gas inlet assembly including a passage encircling the plasma torch and an opening around the plasma torch for injecting a shroud gas around the super-heated gas.

In another aspect, the invention provides an apparatus including a tuyere chamber, a plasma torch configured to produce a superheated gas and to direct the superheated gas into the tuyere chamber in an axial direction, and a shroud gas inlet assembly including a passage encircling the plasma torch and a plurality of blades around the plasma torch for injecting a shroud gas around the super-heated gas.

In another aspect, the invention provides an apparatus including a tuyere chamber configured to be positioned adjacent to a plasma torch, a plurality of gas injection nozzles positioned adjacent to a wall of the tuyere chamber for the purpose of the injection of shroud gas, and wherein the gas injection nozzles direct the shroud gas in a tangential direction to cause the shroud gas to spiral along the wall of the tuyere chamber.

DETAILED DESCRIPTION

In one aspect, the present invention relates to plasma torch assemblies that can be used in combination with a reactor vessel, such as a gasification or vitrification reactor.

In various embodiments a plasma torch, configured to deliver a jet or plume of hot gas flow (also referred to as superheated gas flow) to a chamber, is used in combination with a structure (i.e., the shroud inlet assembly) that delivers a relatively cool gas (i.e., a shroud gas) around the superheated gas stream. The shroud inlet assembly can deliver two or more combinations of cold gas flow that surround the superheated gas flow. The shroud inlet assembly can be connected to a tubular or conical chamber of a tuyere, with openings at either end, which transmits all gas flows to the process of the gasifier or furnace. The chamber can be lined with a refractory material, and can be cooled by a fluid, potentially with a water jacket or a tubular cooling coil which can be embedded within the refractory material. The gas flow within the tuyere chamber can be directed in a way such that the superheated gas remains centered and flowing along a central axis, with the shroud gases flowing between the superheated gas and the chamber wall.

Figure 1:
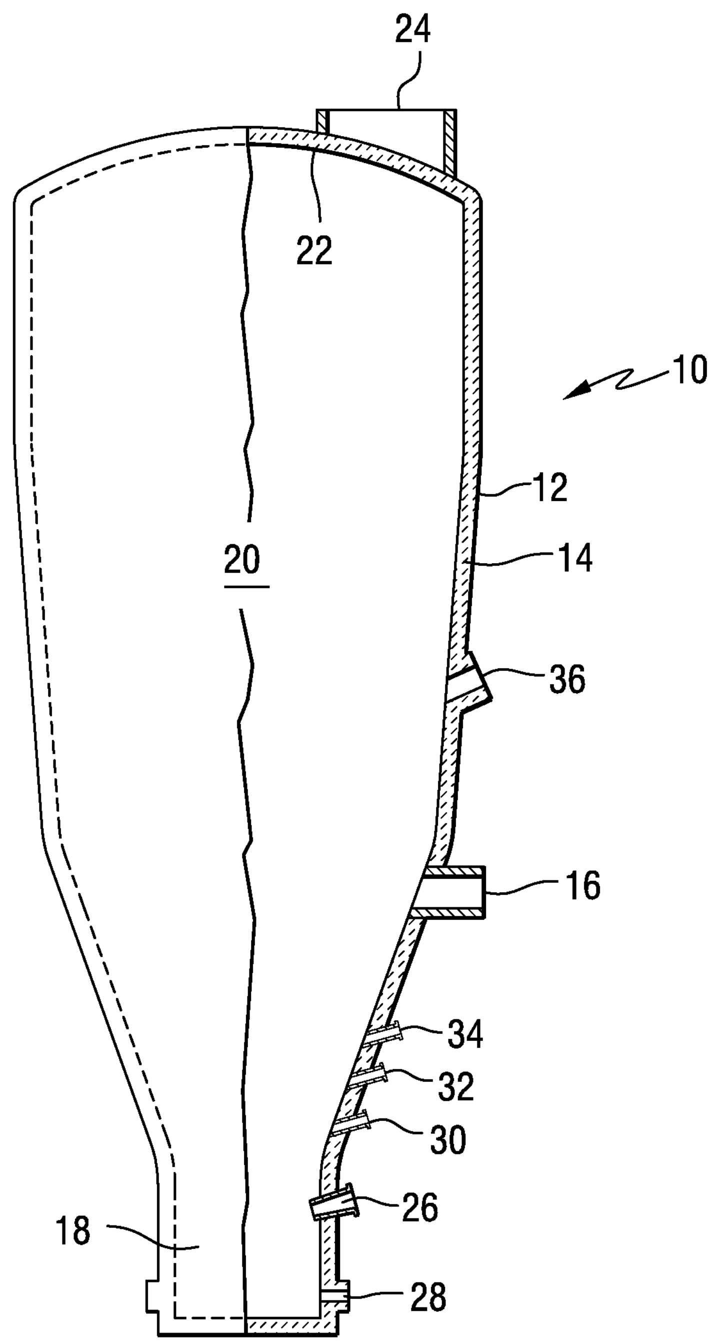
FIG. 1 is an elevation view, partially in section, of an example of a plasma gasification reactor.

FIG. 1 is an example of a plasma gasification reactor (PGR) that may be used for gasification and/or vitrification of various process materials. One manner of operating such a PGR is for gasifying material to produce a syngas from a feed material. The feed material may include, as examples, one or more of materials such as biomass, municipal solid waste (MSW), coal, industrial waste, medical waste, hazardous waste, tires, and incinerator ash. In some installations, the PGR can produce syngas that contains useful amounts of hydrogen and carbon monoxide for subsequent use as a fuel.

The reactor of FIG. 1, shown sectioned in its right half, includes a reactor vessel, furnace, or cupola 10, generally including a steel shell 12 lined with a refractory material 14. One or more ports 16 are provided to insert process material into the reactor vessel. A bottom portion 18 contains a carbonaceous bed above which is a section for a charge bed of process material, such as biomass, municipal solid waste (MSW), coal, industrial waste, medical waste, hazardous waste, tires, and incinerator ash with a freeboard region 20 above the charge bed, and the freeboard region extends up to a roof 22. One or more outlets, such as pipe 24, can be used to extract syngas from the vessel. The vessel can include a partial water quench zone near a top portion that cools the rising gas prior to exiting the vessel.

The portion 18 of reactor vessel 10 enclosing the carbonaceous bed has one or more (typically two to eight) nozzles 26 (sometimes alternatively referred to as ports or tuyeres) and plasma torches (not shown) for injecting a high temperature plasma heated gas into the carbonaceous bed and/or the charge bed. The tuyeres 26 may also be arranged to introduce additional process material that may be desired, such as a gas, liquid, steam, or fine solid particulates, for reactions within the carbonaceous bed and the material of the charge bed. The reactor vessel 10 also contains molten slag at the bottom and includes a molten slag outlet 28, also called a tap hole.

A part of the reactor vessel 10 that is around the charge bed and above the carbonaceous bed further may include some additional nozzles or tuyeres 30, 32, 34, 36 that usually do not contain plasma torches but provide for the introduction into the charge bed of further process material, if desired, such as materials in the form of a gas, liquid, steam or solid particulates. Nozzle 36 and an additional nozzle 38 can be used for start-up burners. An actual reactor vessel may include other elements that are not relevant to the present invention. The present invention, however, is not restricted to reactors with such configurations.

Figure 2:
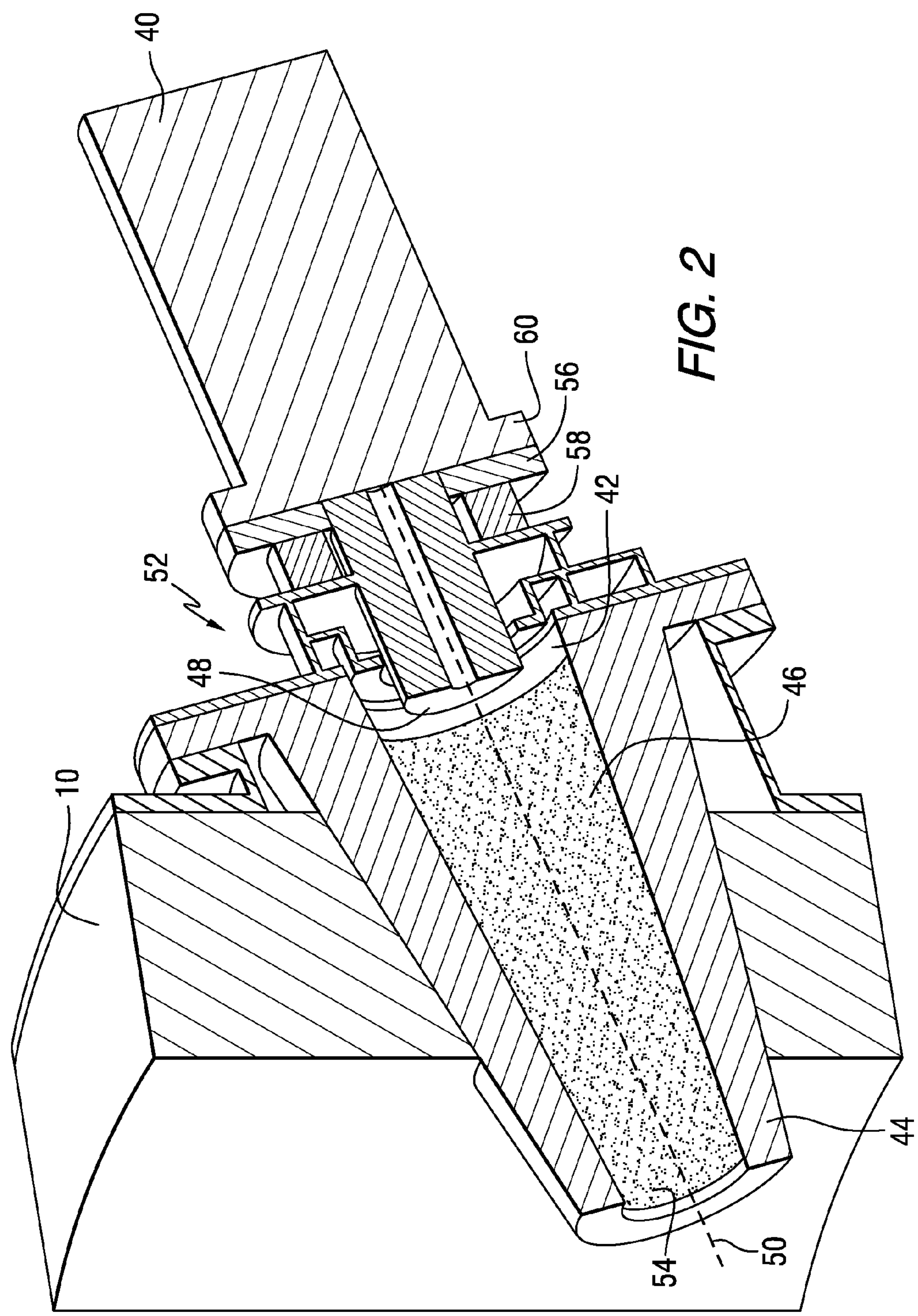
FIG. 2 is a schematic cross-sectional view of a plasma torch and an associated tuyere.

FIG. 2 is a schematic cross-sectional view of an embodiment including a plasma torch 40 positioned adjacent to the inlet 42 of a tuyere 44. The tuyere is mounted in the wall of the reactor vessel 10 and defines a chamber 46. In various embodiments, the chamber can have a cylindrical or frustoconical shape. The plasma torch includes a nozzle 48 that is configured to direct a jet of superheated gas in an axial direction (in this example, the jet of superheated gas is directed along a central axis 50 of the chamber). The chamber can have a circular cross-section in a plane perpendicular to the central axis. The plasma jet can have a temperature of for example 10,000° F. A shroud gas inlet assembly 52 is configured to deliver a cold gas (i.e., a shroud gas) that surrounds the superheated gas (plasma jet) and shields it from the chamber walls. The shroud gas inlet assembly can be positioned adjacent to the tuyere inlet. Both the shroud gas and the superheated gas flow into the reactor, gasifier or furnace. The tuyere chamber can be lined with a refractory material 54, and can be cooled by a fluid, potentially with a water jacket or a tubular cooling coil, not shown in this view, which can be embedded within the walls of the tuyere. In other embodiments, the chamber could be in a water cooled coil or a copper block with cooling channels, which are not lined with a refractory material. The cold gas streams can be directed in a way such that the superheated gas remains focused in axial direction, with the shroud gases flowing between the superheated gas and the chamber wall with minimum mixing of the two streams. In the embodiment of FIG. 2, and O-ring flange seal 56 and knife gate valve 58 are positioned between a flange 60 of the torch and the shroud gas inlet assembly 52. In other embodiments, different spacing of the components can be used and different types of valves can be used. For example, a ball valve can be used in some cases.

Figure 3:
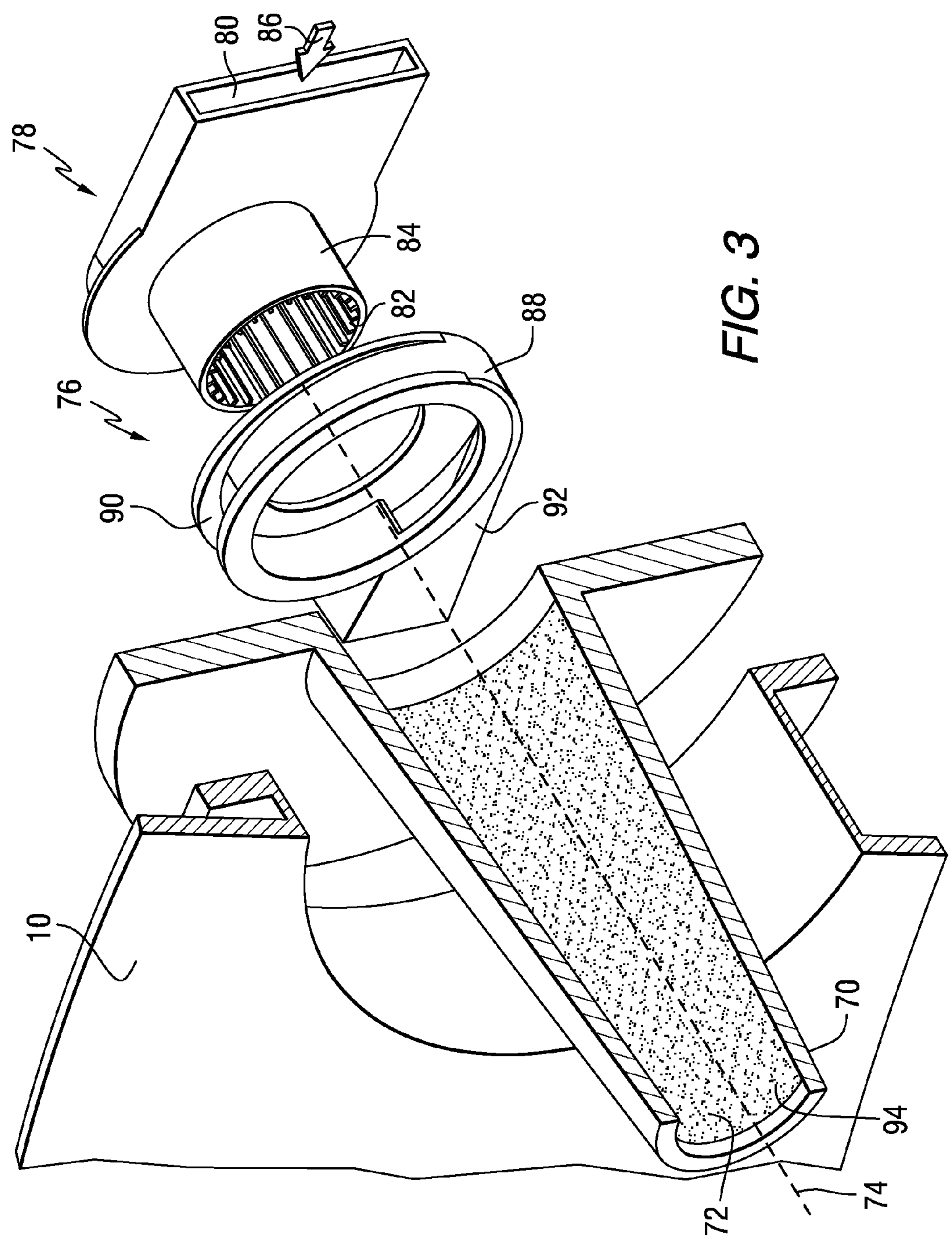
FIG. 3 is a schematic exploded view, partially in section, of a tuyere and shroud gas inlet assembly.

FIG. 3 shows an embodiment in which the shroud gas inlet assembly is arranged such that two distinct flows of shroud gas are introduced. The shroud gas inlet assembly includes two subassemblies. One of which directs shroud gas coaxially with respect to the plasma jet. A second subassembly introduces a swirl flow (using, for example, a tangential or spiral inlet). FIG. 3 is a schematic exploded view of subassemblies of an embodiment including a tuyere 70 that can be mounted in the wall of the reactor vessel 10 and defines a chamber 72. In various embodiments, the chamber can have a tubular or conical interior surface that forms a cylindrical or frustoconical shape. A plasma torch can be configured to direct a jet of superheated gas in an axial direction (in this example, along a central axis 74 of the chamber). The chamber can have a circular cross-section in a plane perpendicular to the central axis. A shroud gas inlet assembly 76 is configured to deliver a cold gas (i.e., a shroud gas) that surrounds the superheated gas and shields the chamber walls. A first portion (or subassembly) 78 of the shroud gas inlet assembly includes a plenum 80 coupled to a plurality of channels 82 positioned in an extended member 84. The nozzle of the plasma torch can be positioned in the extended member and configured to direct a jet of superheated gas in an axial direction (in this example, along a central axis 74 of the chamber). Shroud gas can be injected into the plenum as shown by arrow 86. This shroud gas then passes through the channels and travels in an axial direction through the tuyere chamber around the superheated gas from the plasma torch. A second portion (or subassembly) 88 of the shroud inlet assembly includes a spiral passage 90 the can be positioned around the extended member of the first portion. Shroud gas that is injected into a plenum 92 of the second portion travels through the spiral portion and passes into the tuyere chamber. The spiral passage in effect gradually pinches the shroud gas stream, increasing its velocity. This can lead to higher swirling motion. The shroud gas then travels along a helical path adjacent to the wall of the tuyere chamber. In this embodiment, coaxial flow is used to focus the jet, and swirl flow is used to shield the walls, preventing heat diffusion from the jet.

The constant gas flow, which fills the space between subassembly 88 and extended member 84, forces the gas to move towards the outlet of tuyere 70. Extended member 84 separates the helical gas flow (from plenum 92) from the axial gas flow (from channels 82). As gases do not mix immediately, there will be some distance that helical flow along the inner wall of the chamber will be maintained, with axial shroud gas flow between the plasma plume and the helical shroud gas flow. This arrangement allows fine tuning of the axial to angular velocities to maximize the stability of the superheated gas plume so that it does not impinge on the chamber wall, while minimizing heat loss. Purely axial flow leads to the highest in plume stability, but it also leads to the highest amount of heat loss by the tuyere, reducing energy transfer from the plasma to the reactor process. The opposite is true for spiral flow (i.e., low heat loss, but much less plume stability). Thus spiral shroud gas flow is good for shorter tuyere lengths.

In another embodiment, a tangential shroud gas inlet can be used in which the cross-sectional area of the inlet passage does not decrease. In addition, the shroud gas inlet need not inject the shroud gas in a direction 90° with respect to the central axis. For example the plenum 92 could be angled away from the vessel at a shallow angle of for example 15°.

The shroud gas inlet assembly can be positioned adjacent to one end of the tuyere chamber. Both the shroud gas and the superheated gas flow into the gasifier or furnace. The chamber can be lined with a refractory material 94, and can be cooled by a fluid, potentially with a water jacket or a tubular cooling coil, not shown in this view, which can be embedded within the walls of the tuyere. The gas flow within the chamber can be directed in a way such that the superheated gas remains centered and flowing along the chamber axis, with the shroud gases flowing between the superheated gas and the chamber wall.

In the embodiment of FIG. 3, the inner shroud gas layer is introduced by channels within the shroud gas inlet assembly which direct flow axially, and parallel to the superheated gas flow. An outer shroud gas flow is introduced tangentially by the shroud gas inlet assembly so that gas flow spirals along the wall of the chamber while helping to minimize overall heat loss to the chamber wall. The inner gas flow acts to focus the superheated gas, while the outer gas flow acts to shield the wall of the chamber from hot gas impingement. The combination of these two gas streams allows longer chamber lengths to be used, thereby allowing thicker refractory layers within the furnace/gasifier and larger spacing between the plasma torch and furnace/gasifier wall.

Figure 4:
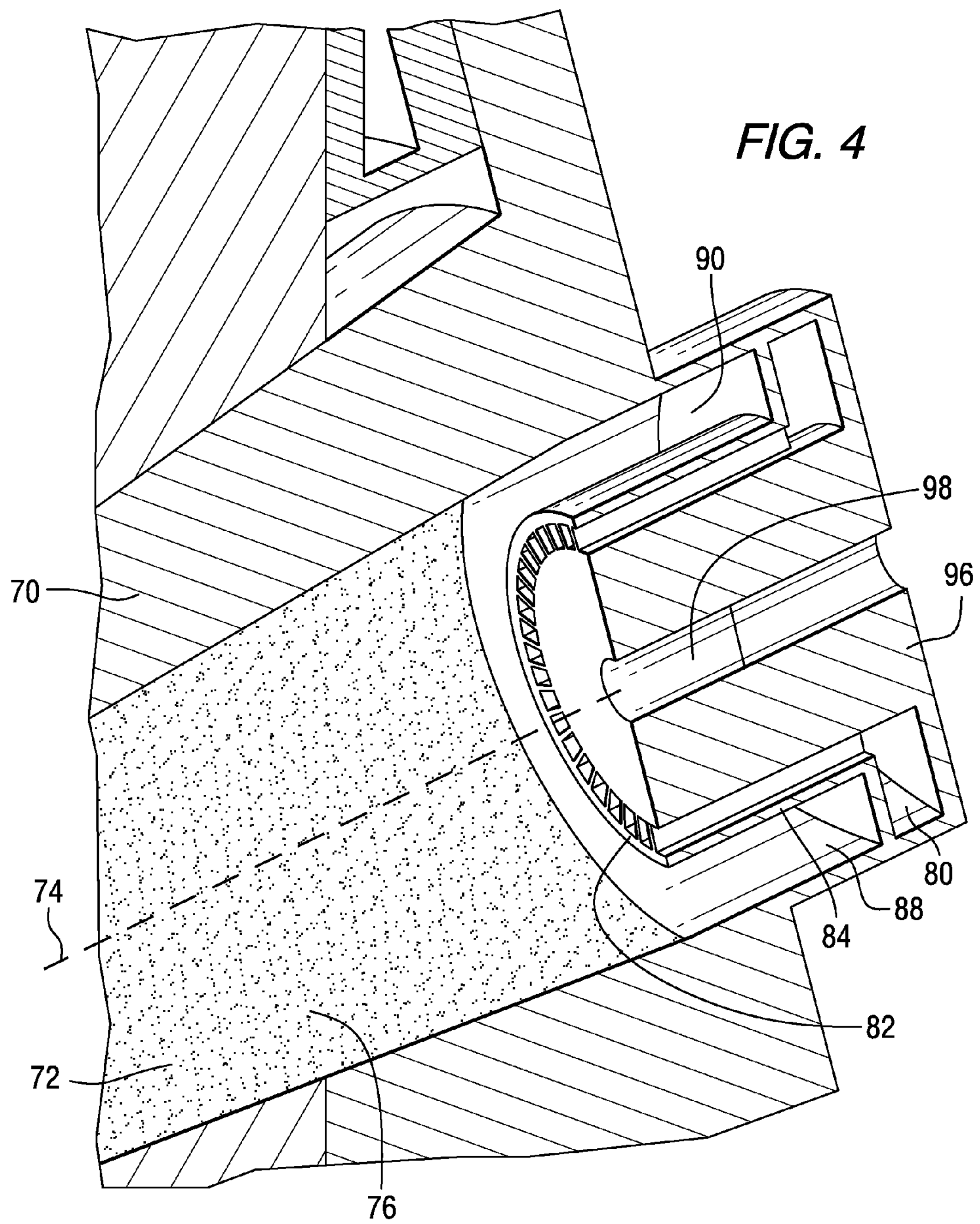
FIG. 4 is a schematic cross-sectional view of a portion of a tuyere and shroud gas inlet assembly.

FIG. 4 is a cross-sectional view showing portions of a plasma torch assembly having the components of FIG. 3, in combination with a plasma torch 96. The plasma torch injects a superheated gas along the central axis 74 of the tuyere chamber 72 through a nozzle 98. Shroud gas that enters plenum 80 is directed through the channels 82, flows in a direction parallel to the central axis 74, and surrounds the superheated gas from the plasma torch. Shroud gas in the spiral passage 90 is directed tangentially into the tuyere chamber and spirals along the wall of the chamber.

Figure 5:
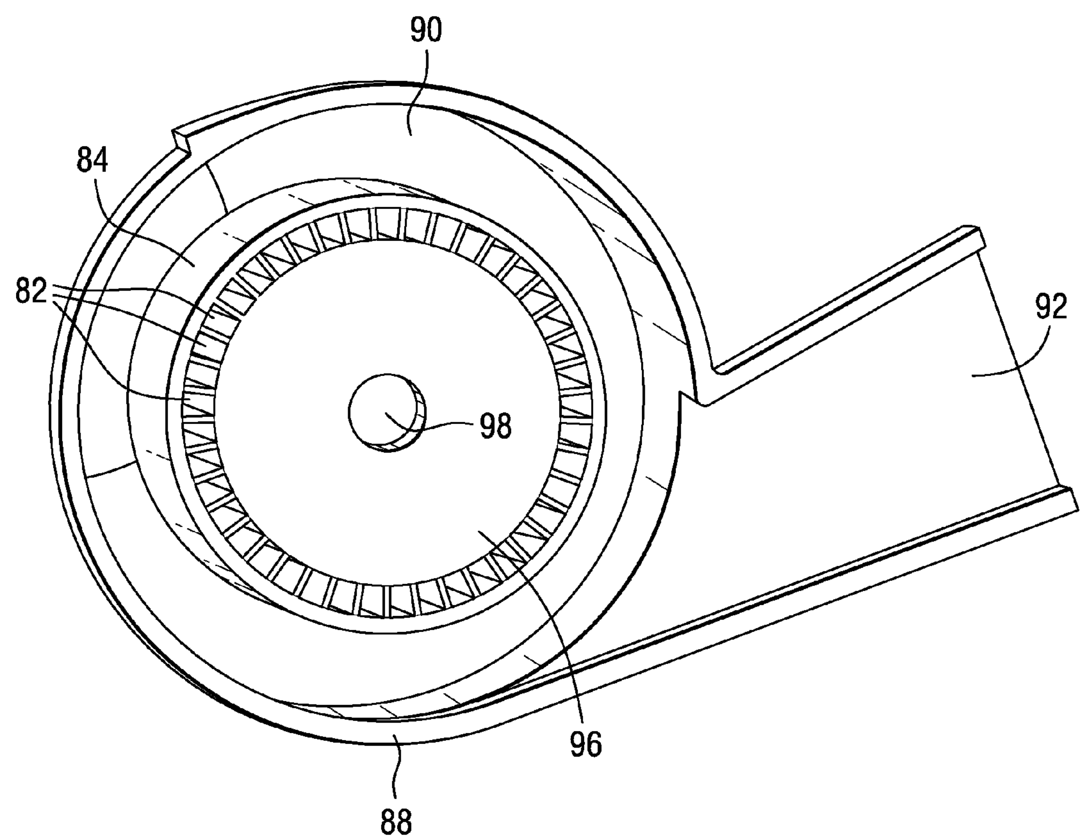
FIG. 5 is a schematic cross-sectional view of the shroud gas inlet assembly of FIG. 4.

FIG. 5 is another view showing portions of the plasma torch assembly of FIG. 4. The plasma torch 96 injects a superheated gas along the central axis of the tuyere chamber through a nozzle 98. Shroud gas is directed through the channels 82, flows in a direction parallel to the central axis, and surrounds the superheated gas from the plasma torch. Shroud gas injected into plenum 92 flows through the passage 90, is directed tangentially into the tuyere chamber, and spirals along the wall of the chamber.

The shroud gas inlet assembly between the plasma torch and the chamber of FIGS. 3-5 includes two portions (or subassemblies), one of which directs shroud gas flow axially and parallel to the plasma plume flow. A second portion directs shroud gas flow tangentially, spiraling along the wall of the tuyere. This structure facilitates transmitting the superheated gas flow over a relatively long distance without breaking down axial flow which would cause the plasma plume to impinge on the tuyere wall, causing excessive heat loss and subsequent damage to the tuyere. In other words, the central jet of superheated gas is separated from cold swirling shroud gas by means of a cold parallel stream of shroud gas, providing a means for focusing the central jet of superheated gas and minimizing heat losses.

Figure 6:
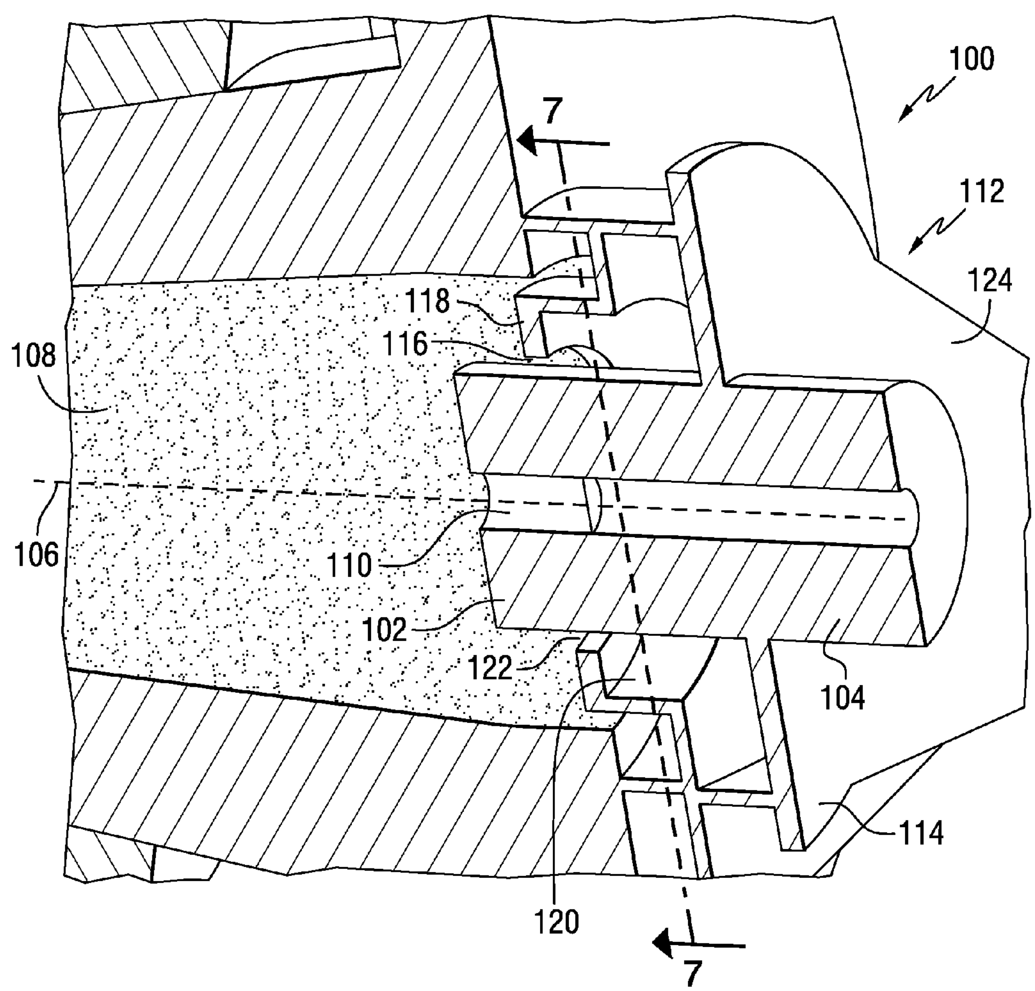
FIG. 6 is a schematic cross-sectional view of a portion of a tuyere and shroud gas inlet assembly.

FIG. 6 is a schematic cross-sectional view of a portion of a plasma torch assembly 100 constructed in accordance with another embodiment of the invention. An end 102 of a plasma torch 104 is positioned to direct a plume of superheated gas along a central axis 106 of a tuyere chamber 108 through a nozzle 110. A shroud gas inlet assembly 112 is configured to direct shroud gas into the tuyere chamber in both axial and swirl streams. The shroud gas inlet assembly 112 includes multiple passages. Shroud gas injected into a first passage 114 exits through a circular (or annular) gap 116 between a flange 118 and the plasma torch to direct the shroud gas in a direction parallel to the central axis and surrounding a plume of superheated gas from the plasma torch nozzle. Shroud gas injected into a second passage 120 exits through a circular (or annular) gap 122 adjacent to a wall of the tuyere chamber. Prior to exiting through gap 122, the shroud gas passes through a spiral passage such that the shroud gas is injected into the tuyere in a direction tangential to the wall of the tuyere. This portion of the shroud gas travels along a helical path adjacent to the tuyere wall, and surrounds a plume of superheated gas from the plasma torch nozzle. Both passages of the shroud inlet assembly can receive shroud gas from a plenum 124.

Figure 7:
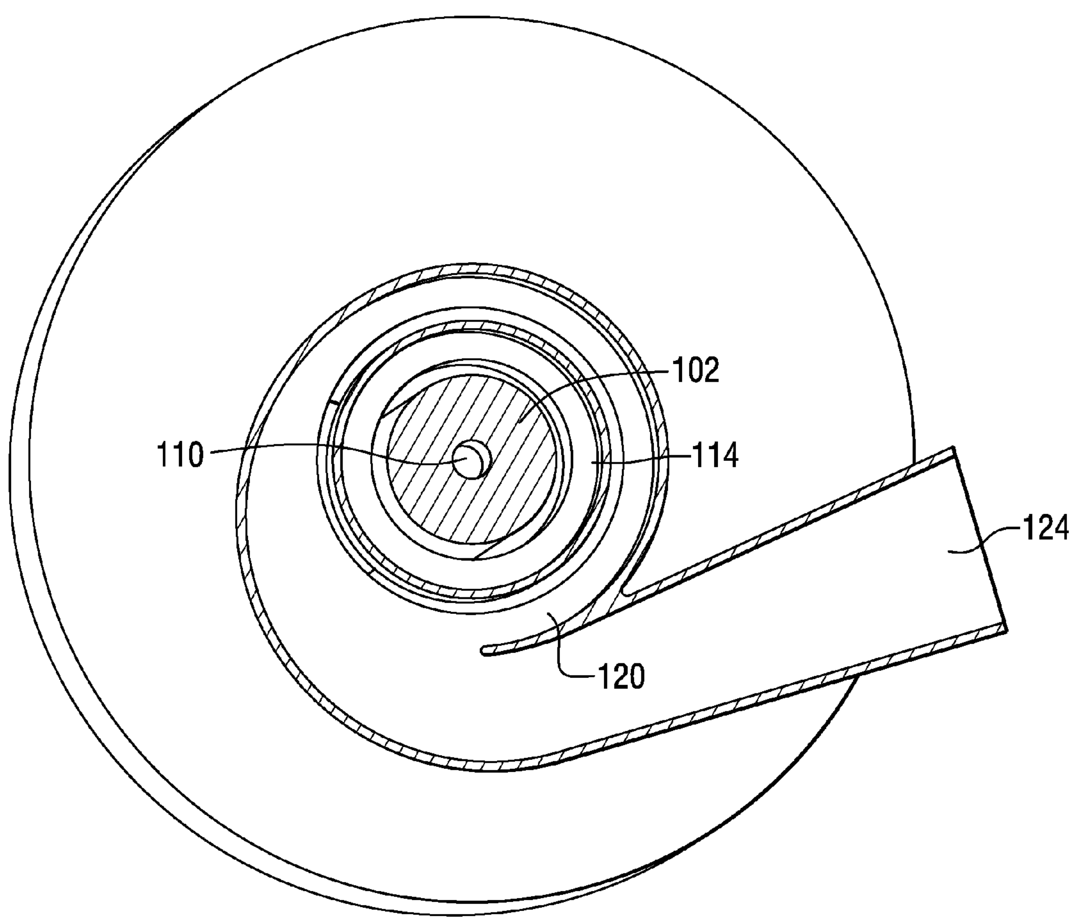
FIG. 7 is a schematic cross-sectional view of the shroud gas spiral inlet assembly of FIG. 6, taken along line 7-7.

FIG. 7 is a view of the assembly of FIG. 6 taken along line 7-7. The outer passage of the shroud gas inlet assembly is shown to form the spiral passage 120. While the shroud gas inlet passage is shown to have a decreasing cross-sectional area, this feature is not required.

Figure 8:
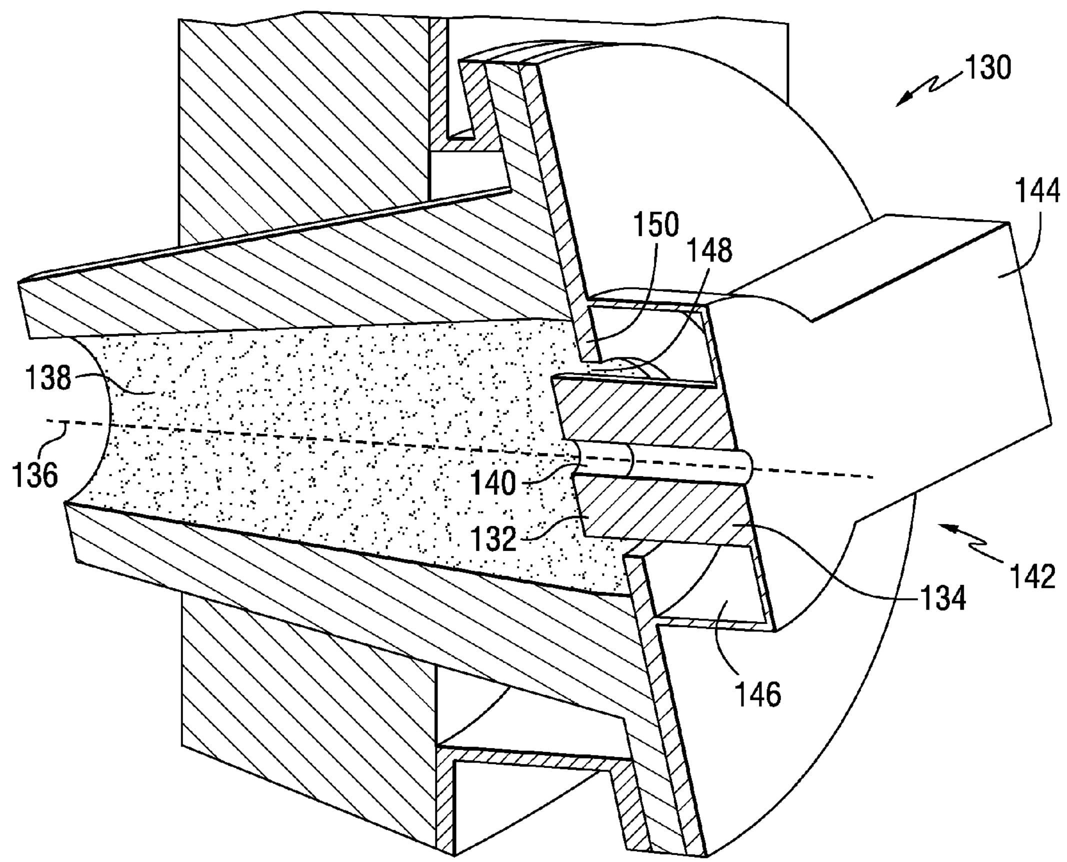
FIGS. 8 through 15 are schematic cross-sectional views of various tuyere and shroud gas inlet assemblies.

FIG. 8 is a schematic cross-sectional view of a portion of a plasma torch assembly 130 constructed in accordance with another embodiment of the invention. An end 132 of a plasma torch 134 is positioned to direct a plume of superheated gas along a central axis 136 of a tuyere chamber 138 through a nozzle 140. A shroud gas inlet assembly 142 is configured to direct shroud gas into the tuyere chamber in an axial direction. The shroud gas inlet assembly 142 includes a plenum 144 and a passage 146 that encircles a portion of the plasma torch. Shroud gas injected into the chamber 146 exits through a circular (or annular) gap 148 between a flange 150 and the plasma torch to direct the shroud gas in a direction parallel to the central axis and surrounding a plume of superheated gas from the plasma torch nozzle. The plenum 144 directs shroud gas into a side of the chamber 146.

Figure 9:
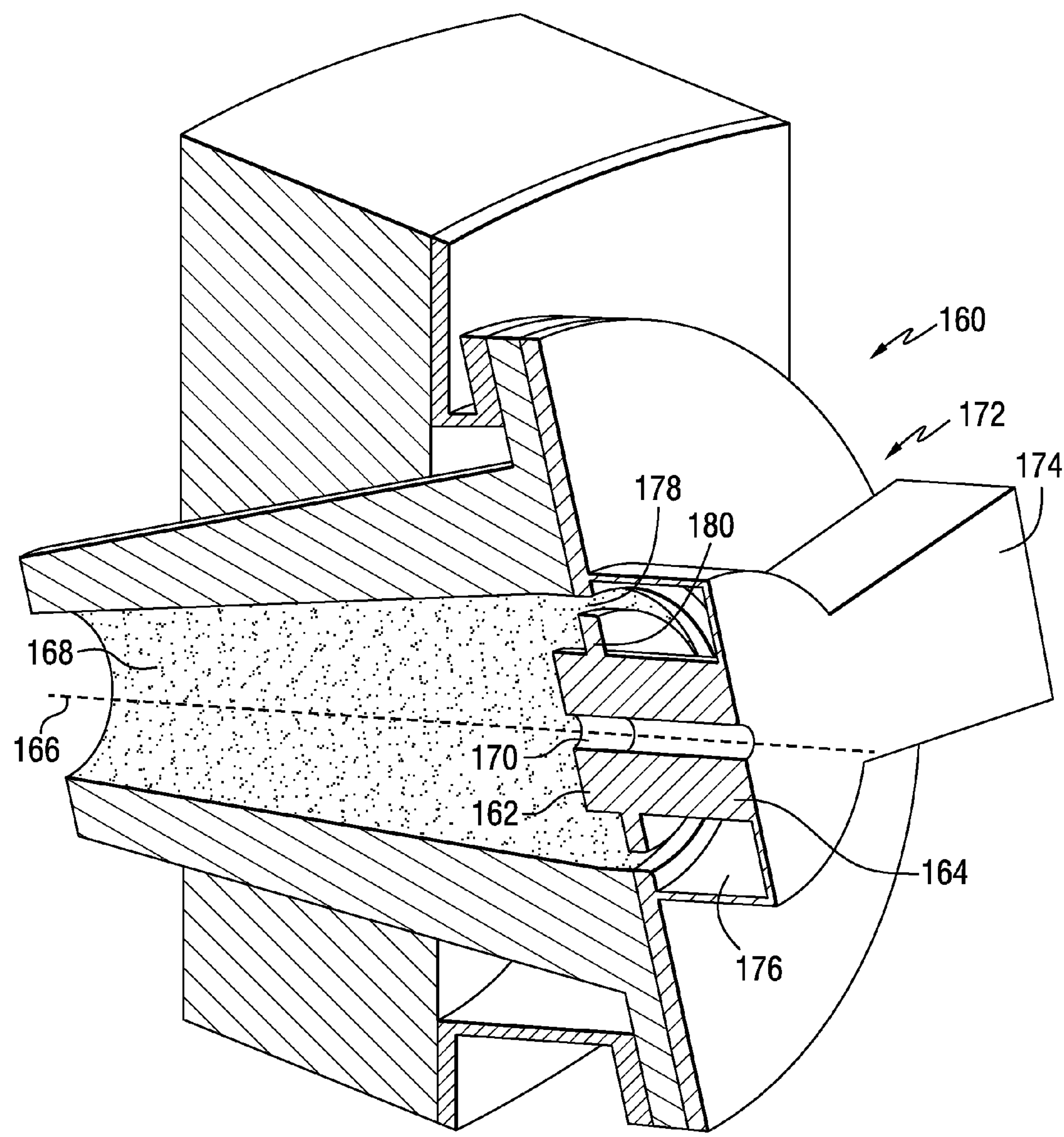

FIG. 9 is a schematic cross-sectional view of a portion of a plasma torch assembly 160 constructed in accordance with another embodiment of the invention. An end 162 of a plasma torch 164 is positioned to direct a plume of superheated gas along a central axis 166 of a tuyere chamber 168 through a nozzle 170. A shroud gas inlet assembly 172 is configured to direct shroud gas into the tuyere chamber in an axial direction. The shroud gas inlet assembly 172 includes a plenum 174 and a passage 176 that encircles a portion of the plasma torch. Shroud gas injected into the tuyere chamber 168 exits through a circular (or annular) gap 178 between a flange 180 and the plasma torch to direct the shroud gas in a direction parallel to the central axis and surrounding a plume of superheated gas from the plasma torch nozzle.

The plenum directs shroud gas into a side of the passage 176 in a direction substantially perpendicular to the central axis of the tuyere chamber 168. Then the shroud gas exits the passage near the outer edge of the tuyere chamber 168.

Figure 10:
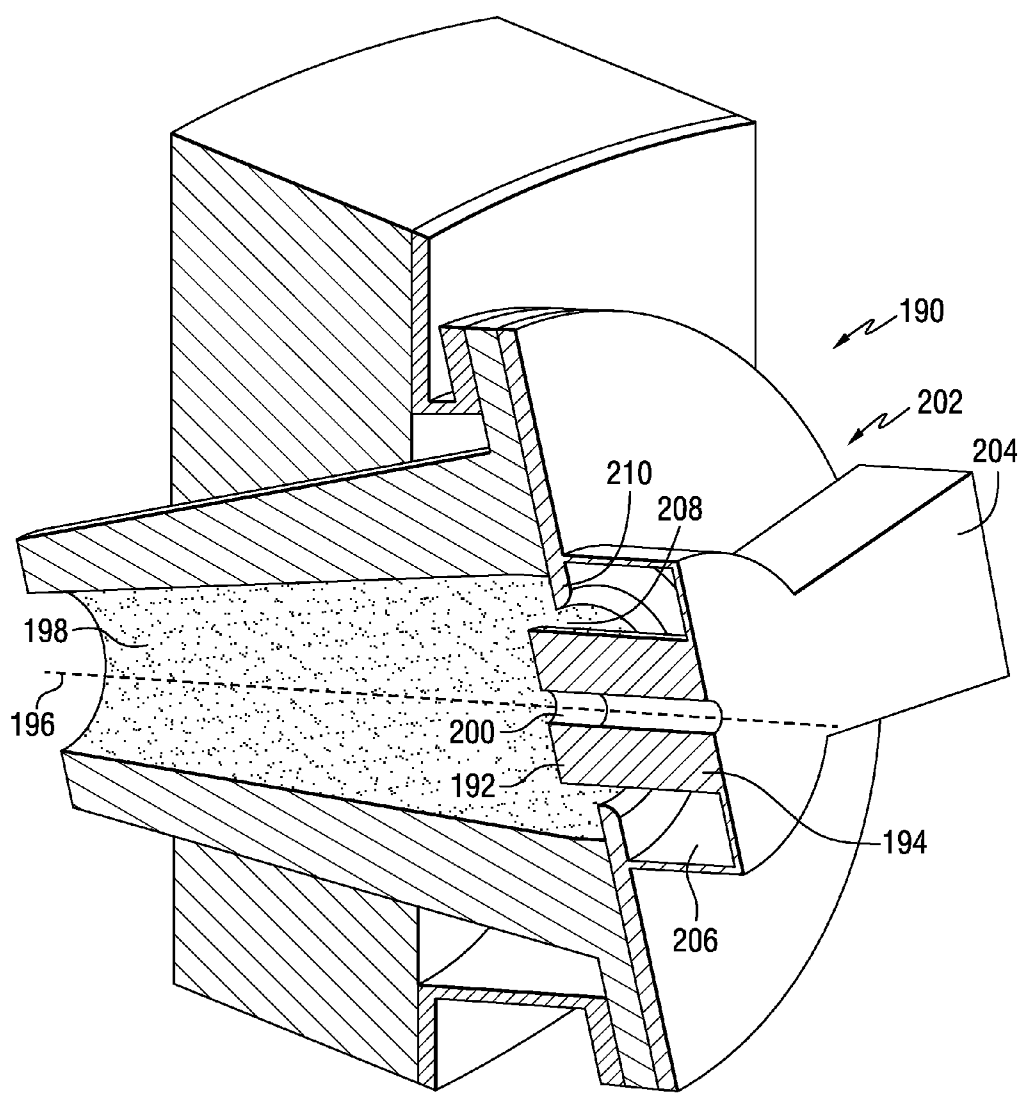

FIG. 10 is a schematic cross-sectional view of a portion of a plasma torch assembly 190 constructed in accordance with another embodiment of the invention. An end 192 of a plasma torch 194 is positioned to direct a plume of superheated gas along a central axis 196 of a tuyere chamber 198 through a nozzle 200. A shroud gas inlet assembly 202 is configured to direct shroud gas into the tuyere chamber in an axial direction. The shroud gas inlet assembly 202 includes a plenum 204 and a passage 206 that encircles a portion of the plasma torch. Shroud gas injected into the chamber 206 exits through a circular (or annular) gap 208 between a flange 210 and the plasma torch to direct the shroud gas in a direction parallel to the central axis and surrounding a plume of superheated gas from the plasma torch nozzle.

Figure 11:
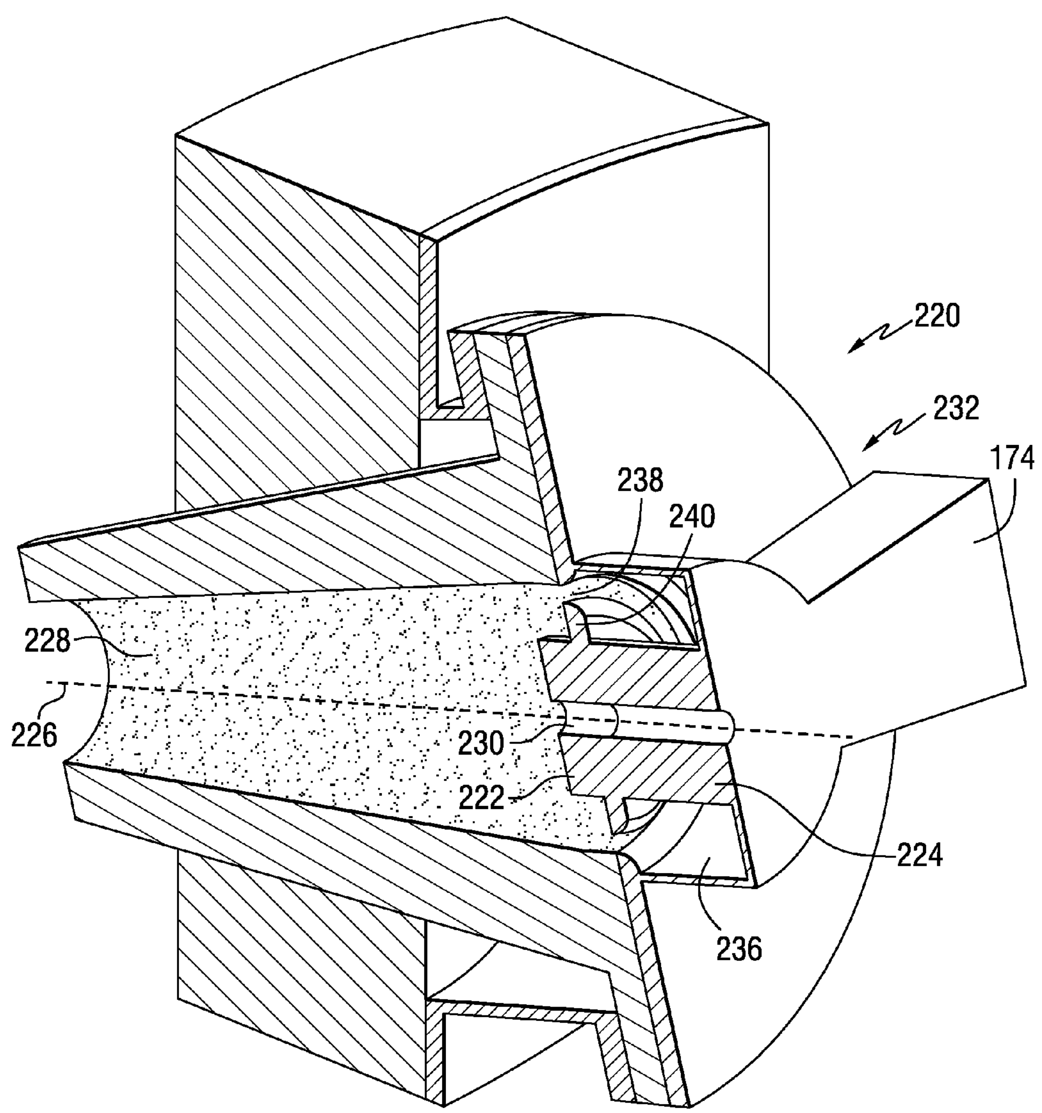

FIG. 11 is a schematic cross-sectional view of a portion of a plasma torch assembly 220 constructed in accordance with another embodiment of the invention. An end 222 of a plasma torch 224 is positioned to direct a plume of superheated gas along a central axis 226 of a tuyere chamber 228 through a nozzle 230. A shroud gas inlet assembly 232 is configured to direct shroud gas into the tuyere chamber to produce an axial flow of shroud gas. The shroud gas inlet assembly 232 includes a plenum 234 and a passage 236 that encircles a portion of the plasma torch. Shroud gas injected into the passage 236 exits through a circular gap 238 between a flange 240 and an edge of the shroud gas inlet assembly to direct the shroud gas in a direction parallel to the central axis and surrounding a plume of superheated gas from the plasma torch nozzle. The plenum directs shroud gas into a side of the tuyere chamber 228 along the outer edge of the tuyere chamber 228. In this embodiment, the flange 240 and the edge of the passage 236 each include a beveled surface.

Figure 12:
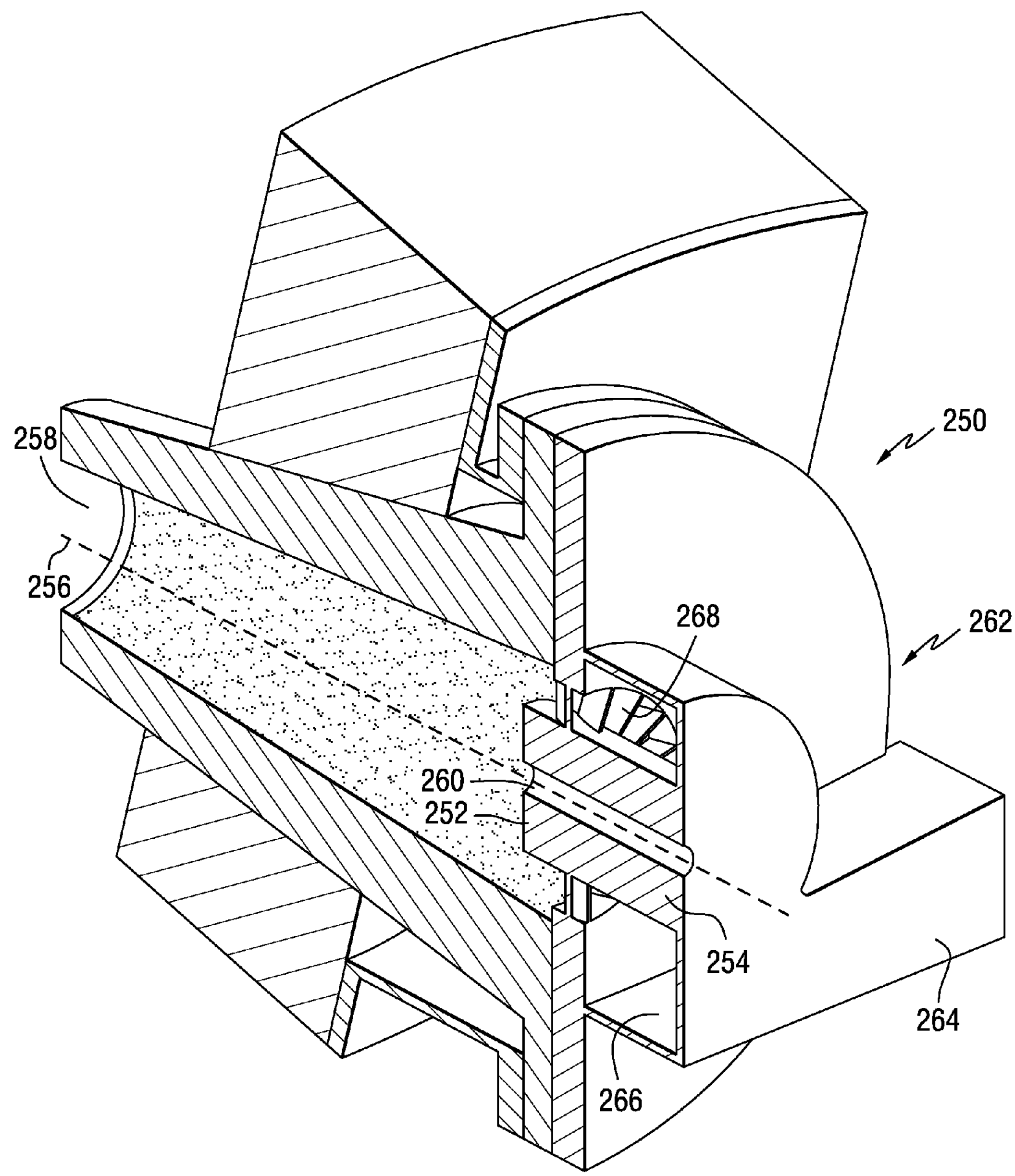

While the embodiments of FIGS. 8-11 show structures that inject the shroud gas in the tuyere chamber in an axial direction, it should be understood that various modifications can be made to these embodiments to provide for a rotational or helical flow of the shroud gas. For example, the plenums 144, 174 and 204 could be positioned to direct the shroud gas into the passages in a direction that is offset from the central axis of the tuyere chamber, thereby creating a rotational flow of shroud gas as it enters the tuyere chamber. An offset plenum is shown in FIG. 12 described below. In other embodiments, additional structures can be added to produce a tangential or spiral flow of shroud gas. For example, portions of the structures of FIG. 5 or 7 could be added to the embodiments of FIGS. 8-11 to create a tangential or spiral flow of shroud gas.

FIG. 12 is a schematic cross-sectional view of a portion of a plasma torch assembly 250 constructed in accordance with another embodiment of the invention. An end 252 of a plasma torch 254 is positioned to direct a plume of superheated gas along a central axis 256 of a tuyere chamber 258 through a nozzle 260. A shroud gas inlet assembly 262 is configured to direct shroud gas into the tuyere chamber in both axial and tangential directions. The shroud gas inlet assembly 262 includes a plenum 264 and a passage 266 that encircles a portion of the plasma torch. Shroud gas injected into the passage 266 exits through a blade assembly 268. The blade assembly directs the shroud gas into the tuyere chamber 258. Blades in the blade assembly can be oriented to cause the shroud gas to flow axially and/or helically through the tuyere chamber. The plenum directs shroud gas along the outer edge of the tuyere chamber 258 to create a rotational flow of the shroud gas. In some embodiments, the blade assembly can be a stand-alone part that is interchangeable. This would permit several options with varying blade angles. The blade assemblies could be installed in accordance with the expected shroud flow (i.e. low shroud gas flow would likely necessitate more axial flow than higher shroud gas flows).

Figure 13:
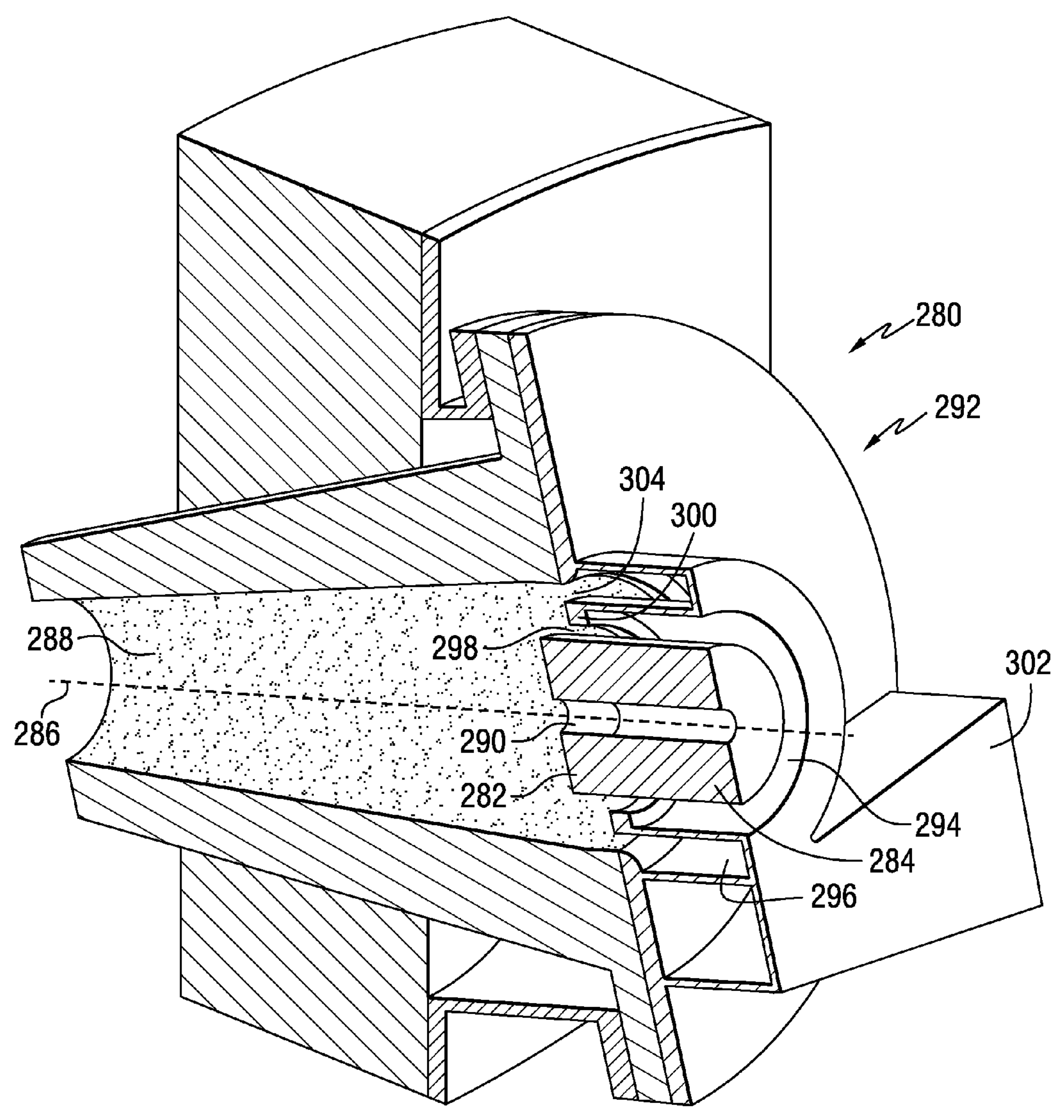

FIG. 13 is a schematic cross-sectional view of a portion of a plasma torch assembly 280 constructed in accordance with another embodiment of the invention. An end 282 of a plasma torch 284 is positioned to direct a plume of superheated gas along a central axis 286 of a tuyere chamber 288 through a nozzle 290. A shroud gas inlet assembly 292 is configured to direct shroud gas into the tuyere chamber in both axial and tangential directions. The shroud gas inlet assembly 292 includes two passages 294, 296 that encircle a portion of the plasma torch. Shroud gas injected into one passage 294, for example through a plenum similar to the plenum 80 in FIG. 3, exits through a circular (or annular) gap 298 between the plasma torch and a flange 300. Shroud gas injected into the other passage 296 through a plenum 302 exits passage 296 through a circular (or annular) gap 304 to create a rotational flow of the shroud gas. This portion of the shroud gas then flows along the outer edge of the chamber 288.

Figure 14:
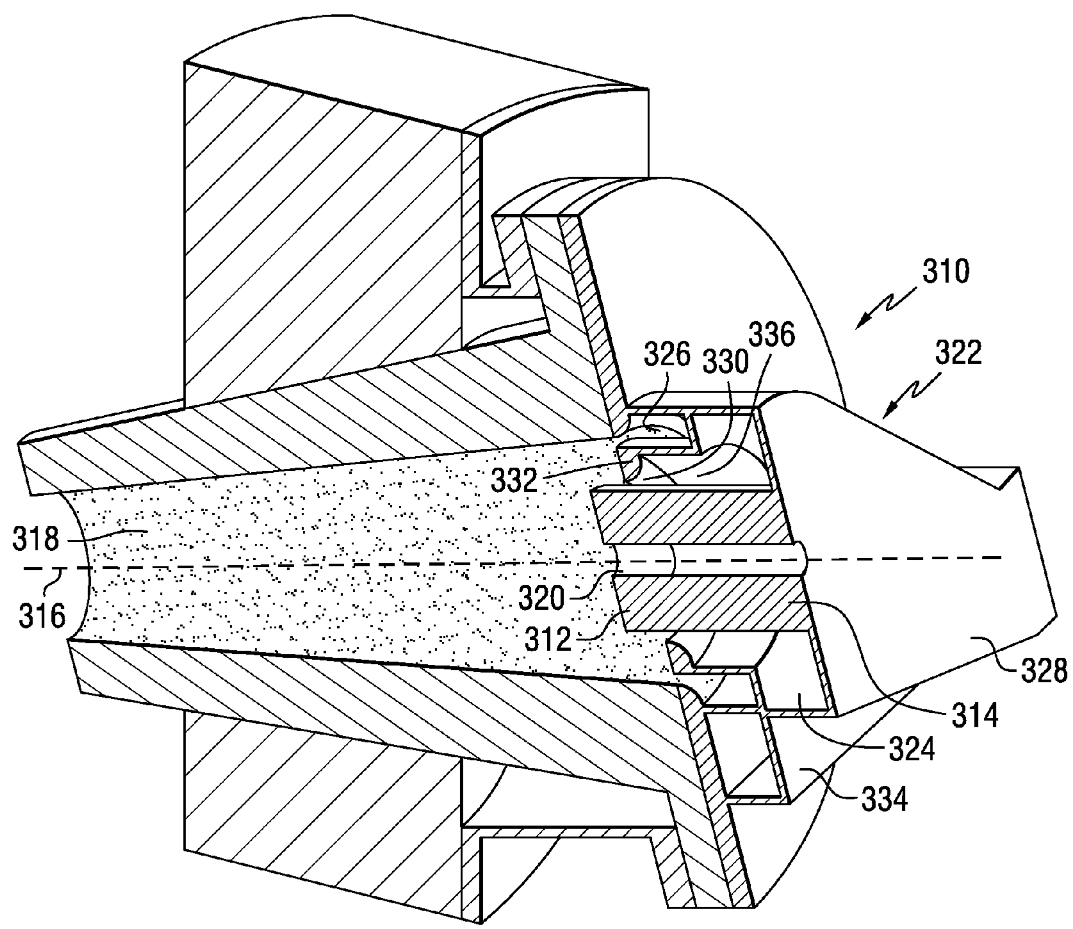

FIG. 14 is a schematic cross-sectional view of a portion of a plasma torch assembly 310 constructed in accordance with another embodiment of the invention. An end 312 of a plasma torch 314 is positioned to direct a plume of superheated gas along a central axis 316 of a tuyere chamber 318 through a nozzle 320. A shroud gas inlet assembly 322 is configured to direct shroud gas into the tuyere chamber in both axial and tangential directions. The shroud gas inlet assembly 322 includes two passages 324, 326 that encircle a portion of the plasma torch. Shroud gas injected into one passage 324, for example through a plenum 328, exits through a circular (or annular) gap 330 between the plasma torch and a flange 332. Shroud gas injected into the other passage 326 through a plenum 334 and exits passage 326 through a circular (or annular) gap 336 to create a rotational flow of the shroud gas. This portion of the shroud gas then flows along the outer edge of the tuyere chamber 318.

Figure 15:
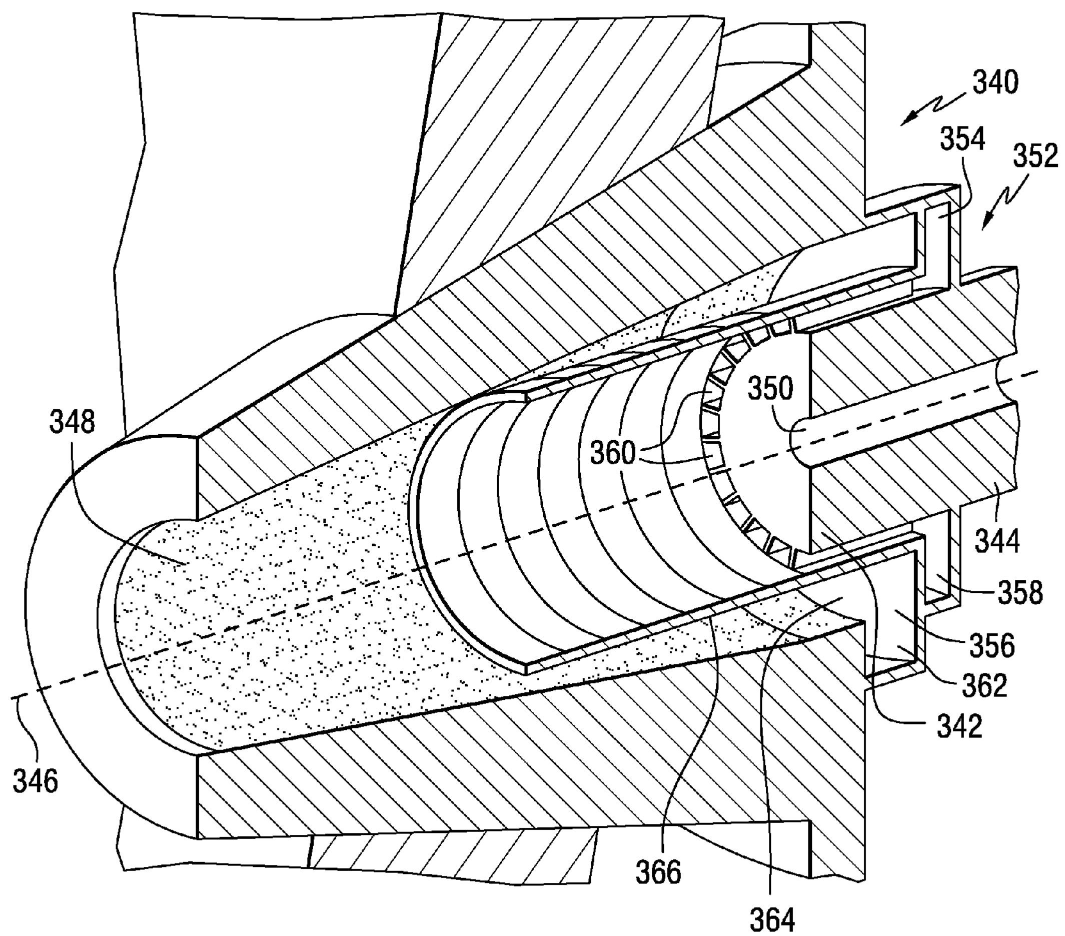

FIG. 15 is a schematic cross-sectional view of a portion of a plasma torch assembly 340 constructed in accordance with another embodiment of the invention. An end 342 of a plasma torch 344 is positioned to direct a plume of superheated gas along a central axis 346 of a tuyere chamber 348 through a nozzle 350. A shroud gas inlet assembly 352 is configured to direct shroud gas into the tuyere chamber in both axial and tangential directions. The shroud gas inlet assembly 352 includes two passages 354, 356 that encircle a portion of the plasma torch. Shroud gas injected into one passage 354 through a plenum 358 exits through a plurality of channels 360 that surround the plasma torch. Shroud gas injected into the other passage 356 through a plenum 362 and exits passage 356 through a circular gap 364 to create a rotational flow of the shroud gas. A shield 366 extends from the end of the plasma torch and separates the two shroud gas flows over at least a portion of the chamber 348. In one example, the shield can have a substantially cylindrical shape. In another example, the shield can have a substantially frustoconical shape.

Figure 16:
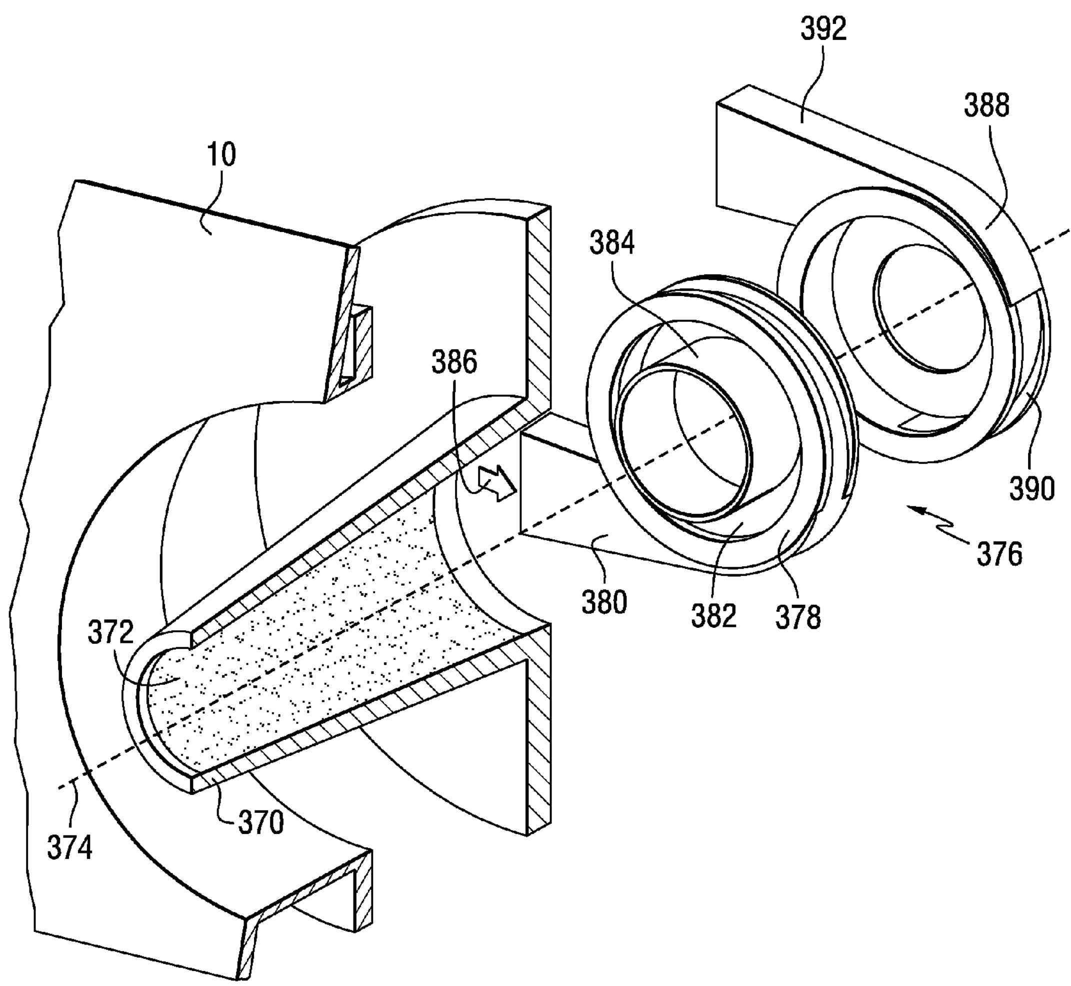
FIG. 16 is a schematic exploded view, partially in section, of a tuyere and shroud gas inlet assembly.

FIG. 16 is a schematic exploded view of portions of an embodiment including a tuyere 370 that can be mounted in the wall of the reactor vessel 10 and defines a chamber 372. In various embodiments, the chamber can have a tubular or conical interior surface that forms a cylindrical or frustoconical opening. A plasma torch can be configured to direct a plume of superheated gas in a direction along a central axis 374 of the chamber. The chamber opening can have a circular cross-section in a plane perpendicular to the central axis. A shroud gas inlet assembly 376 is configured to deliver a cold gas (i.e., a shroud gas) that surrounds the superheated gas from the torch. A first portion (or subassembly) 378 of the shroud gas inlet assembly includes a plenum 380 coupled to an opening 382 positioned around an extended member 384. The nozzle of the plasma torch can be positioned in the extended member and configured to direct a plume of superheated gas in a direction along a central axis 374 of the chamber. Shroud gas can be injected into the plenum as shown by arrow 386. This shroud gas then passes through the channels and travels along a first helical path through the tuyere chamber around the superheated gas from the plasma torch. A second portion (or subassembly) 388 of the shroud gas inlet assembly includes a spiral passage 390. Shroud gas that is injected into a plenum 392 of the second portion travels along a second helical path through the chamber around the superheated gas from the plasma torch. In this embodiment, the shroud gas travels along two opposing helical paths through the tuyere chamber. Shroud gas is injected from passage 390 to the section between extended member 384 and the plasma torch nozzle. Gas from subassembly 378 is injected along the outside of extended member 384. Extended member 384 separates the two swirling flows. In the region beyond the extended member, mixing of the two streams would depend on the ratio of their momentums and swirl number.

In other embodiments, additional shroud gas flows can be introduced tangentially and/or axially at intervals along the length of the chamber. This can be done by means of passageways (or tubes) which are embedded within the refractory material of the tuyere. One example introduces additional shroud flow every 12 inches of chamber length. This additional shroud gas flow can maintain a constant spiral down the length of the tuyere, without which an eventual spiral breakdown would occur and impingement of the superheated gas stream on the chamber wall would result.

Figure 18:
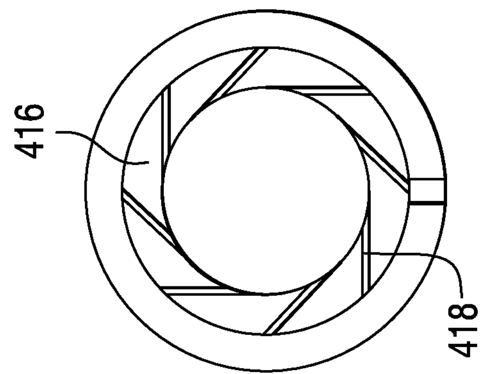
FIG. 18 is a cross-sectional view of the tuyere of FIG. 17 taken along line 18-18.
Figure 17:
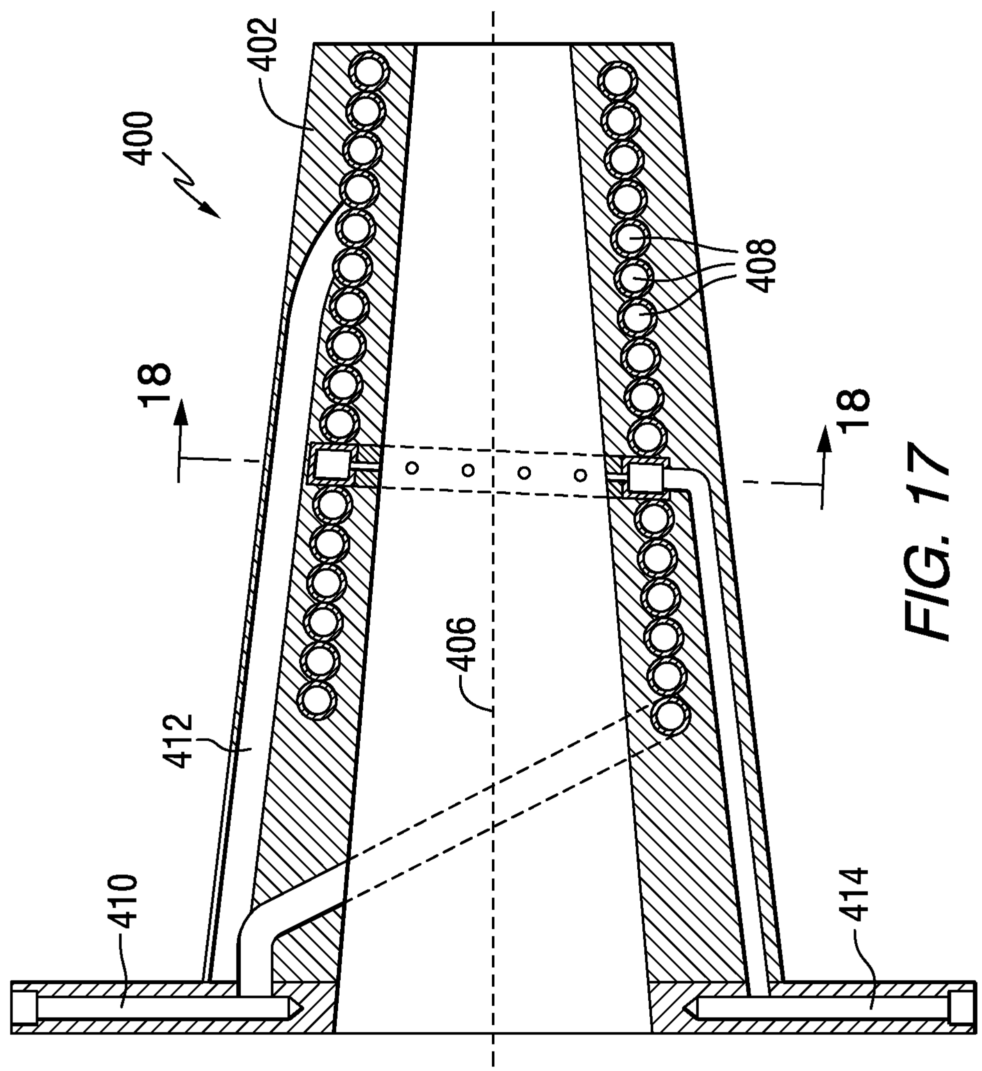
FIG. 17 is a cross-sectional view of a portion of a tuyere with multiple shroud gas nozzles.

Shroud gas injection nozzles can be distributed axially throughout the length of the tuyere chamber for the purpose of the injection of shroud gas of single or varying compositions. FIG. 17 is a cross-sectional view of a portion of a fluid cooled tuyere assembly 400. FIG. 18 is a cross-sectional view of the tuyere of FIG. 17 taken along line 18-18. A tuyere 402 can be mounted in the wall of the reactor vessel as shown in the other embodiments and defines a chamber 404. In various embodiments, the chamber can have a tubular or conical interior surface that forms a cylindrical or frustoconical opening. A plasma torch can be configured to direct a plume of superheated gas in a direction along a central axis 406 of the chamber. The chamber opening can have a circular cross-section in a plane perpendicular to the central axis. A cooling jacket having a plurality of coolant tubes 408 can be embedded in the tuyere and configured to pass around the chamber 404. The coolant tubes 408 can be connected to a coolant inlet 410 and a coolant outlet 412. One or more shroud gas inlet assembly 416 can be positioned at axially spaced locations along the tuyere. The shroud gas inlet assembly 416 include a plurality of tubes, passages or openings 418 that are positioned adjacent to a wall of the tuyere and oriented to inject shroud gas tangentially into the tuyere chamber.

In another embodiment, the tuyere can be cooled using a cooling fluid, such as air, oxygen, steam, or $CO_2$, and the cooling fluid can be used as a process gas. A portion or all of the cooling fluid can be released to the process at the outlet of the tuyere. This fluid can be required as a process gas (e.g., steam for overall temperature moderation via carbon-steam reaction within a coke bed, oxygen for gasification/combustion, or $CO_2$ for a reverse Boudouard reaction that occurs within the coke bed). By using the process gas as the cooling medium, any heat transmitted via either radiation or convection from the superheated gas stream to the chamber is captured by the process gas and transmitted to the process. This can improve the overall efficiency of the process by eliminating the waste heat that would otherwise be lost to cooling water.

In any of the described embodiments, the tuyere can be constructed of parallel wound tubular conductive material, such as copper, cast in a refractory (or similar) matrix. One or more of the cooling tubes of the tuyere can have an outlet at the furnace end for the purpose of injecting a specific gas into the gasifier or furnace. If oxygen, air, steam, or some other medium is used to cool the tuyere, that medium can be injected into the process at the outlet, and the heat lost from the plasma plume to the tuyere cooling system can be recovered, and injected as preheated air/oxygen or steam into the process, thereby improving the overall process efficiency. If pressurized water is used as a cooling medium, then heat can be recovered for use elsewhere in the process (such as for pre-heating air or oxygen via indirect heat exchange).

The various embodiments described herein allow for transmitting the superheated gas flow for a relatively long distance without breaking down axial flow which would cause the plasma plume to impinge on the tuyere wall, causing excessive heat loss and subsequent damage to the tuyere. In other words, the central superheated gas jet is separated from the cold swirling shroud gas by means of a cold parallel stream or shroud gas, providing means of focusing the central superheated gas jet and minimizing heat losses.

As described above, various embodiments include means for introducing a shroud gas into the tuyere chamber that cooperates with the plasma torch and the tuyere chamber so that the superheated gas enters the tuyere chamber along its central axis and the shroud gas enters the tuyere chamber radially outward from the superheated gas and in such a manner that the temperature profile of the gases flowing through the tuyere chamber is substantially hotter in the central portion of the tuyere chamber than adjacent the refractory lining.

The means for introducing shroud gas into the tuyere chamber can comprise a shroud gas inlet assembly including one or more passages disposed near an end of the tuyere chamber opposite the end open to the furnace, the passages being in fluid communication with a shroud gas input plenum and the tuyere chamber. An opening can be provided between the tuyere chamber and the shroud gas inlet assembly passage and the plasma torch can be so disposed that the portion thereof from which superheated gas is provided is axially aligned with the opening and disposed at least partially within the shroud gas inlet assembly passage. The portion of the plasma torch from which the superheated gas is provided can generally fill the opening between the shroud gas inlet assembly passage and the tuyere chamber and there may be a separator wall disposed therebetween with a plurality of ports disposed radially outwardly of the opening and the ports can be oriented to cause the shroud gas to swirl as it enters the mixing chamber. The portion of the plasma torch that supplies the superheated gas can be disposed adjacent the opening so as to provide an annular space between the portion of the plasma torch which supplies the superheated gas and the opening of the shroud gas passage. The shroud gas inlet assembly passage can be connected to a plenum tangentially whereby the shroud gas swirls in the shroud gas inlet assembly passage and as it passes through the annular opening into the tuyere chamber. The shroud gas could include steam, $CO_2$, or other gases that participate in reactions with carbon within the gasifier or furnace.

While the invention has been described in terms of various embodiments, it will be apparent to those skilled in the art that numerous changes can be made to the disclosed embodiments without departing from the scope of the claims set forth below. For example, elements of the various described embodiments can be used in combination with each other to form additional embodiments.

What is claimed is:

1. An apparatus comprising:

a tuyere chamber;

a plasma torch having a nozzle configured to produce a superheated gas and to direct the superheated gas into the tuyere chamber in an axial direction; and a shroud gas inlet assembly configured to direct a shroud gas into the tuyere chamber wherein one part of the shroud gas is injected coaxially with the super heated gas and a second part of the shroud gas is injected as a swirl shielding the tuyere walls, wherein the shroud gas inlet assembly includes:

a first plenum coupled to in an extended member positioned around the nozzle;

a plurality of axially oriented channels in the extended member and positioned around the plasma torch;

a spiral passage positioned around the extended member; and an opening between the spiral passage and the tuyere chamber.

2. The apparatus of claim 1, wherein the extended member separates a portion of the shroud gas flowing coaxially and a portion of the shroud gas flowing spirally.

3. The apparatus of claim 1, wherein the opening is a circular opening positioned adjacent the extended member.

4. The apparatus of claim 1, wherein the spiral passage has a constant cross-sectional area.

5. The apparatus of claim 4, further comprising:

a second plenum configured to direct shroud gas into the spiral passage.

6. The apparatus of claim 1, further comprising:

a shield extending from the plasma torch between the first and second portions of the shroud gas.

7. The apparatus of claim 1, wherein the tuyere chamber is tapered so that the end open into a furnace is smaller than an end adjacent the shroud gas inlet assembly.

8. The apparatus of claim 1, wherein the shroud gas comprises one or more of:

steam, $CO_2$, or other gases that participate in reactions with carbon within a gasifier or furnace.

9. An apparatus comprising:

a tuyere chamber;

a plasma torch configured to produce a superheated gas and to direct the superheated gas into the tuyere chamber in an axial direction; and a shroud gas inlet assembly including a passage encircling the plasma torch and a first annular opening around the plasma torch configured to inject a shroud gas in an axial direction around the super-heated gas, wherein the shroud gas inlet assembly further includes:

a spiral passage configured to inject shroud gas through a second annular opening in a tangential direction adjacent to a wall of the tuyere.

10. The apparatus of claim 9, wherein the shroud gas inlet assembly includes:

a first plenum coupled to a side of the shroud gas inlet assembly passage to direct shroud gas into the shroud gas inlet assembly passage in a direction toward the plasma torch; and the first annular opening is formed between the plasma torch and a flange.

11. The apparatus of claim 9, wherein the shroud gas inlet assembly includes:

a first plenum coupled to the shroud gas inlet assembly passage to direct shroud gas into the shroud gas inlet assembly passage in a direction tangential to the plasma torch; and the second annular opening is formed between a side of the shroud gas inlet assembly passage and a flange.

12. The apparatus of claim 9, wherein the shroud gas inlet assembly passage has a spiral shape, and the opening is formed between the plasma torch and a flange.

13. The apparatus of claim 9, wherein the shroud gas inlet assembly passage has a spiral shape, and the opening is formed between a side of the shroud gas inlet assembly passage and a flange.

14. The apparatus of claim 9, wherein the shroud gas comprises one or more of:

steam, $CO_2$, or other gases that participate in reactions with carbon within a gasifier or furnace.

15. An apparatus comprising:

a tuyere chamber;

a plasma torch configured to produce a superheated gas and to direct the superheated gas into the tuyere chamber in an axial direction; and a shroud gas inlet assembly including an annular passage encircling the plasma torch and a plurality of blades positioned annular passage around the plasma torch for injecting a shroud gas around the super-heated gas.

16. The apparatus of claim 15, wherein the shroud gas comprises one or more of:

steam, $CO_2$, or other gases that participate in reactions with carbon within a gasifier or furnace.

17. An apparatus comprising:

a tuyere chamber configured to be positioned adjacent to a plasma torch;

a plurality of gas injection nozzles positioned adjacent to a wall of the tuyere chamber for the purpose of the injection of shroud gas, the plurality of gas injection nozzles being located at a position that is axially displaced from both an end of plasma torch and an end of the tuyere chamber; and wherein the gas injection nozzles direct the shroud gas in a tangential direction to cause the shroud gas to spiral along the wall of the chamber.

18. The apparatus of claim 17, further comprising:

a shroud gas inlet assembly between the plasma torch and the tuyere chamber configured to direct shroud gas flow either axially or tangentially or both along the wall of the chamber, thereby protecting the chamber wall from superheated gas.

19. The apparatus of claim 18, wherein the shroud gas inlet assembly comprises:

two passages;

wherein a first one of the passages is configured to direct shroud gas flow axially and parallel to a plasma plume flow, and a second one of the passages is configured to direct flow tangentially, spiraling along the wall of the tubular mixing chamber.

20. The apparatus of claim 17, wherein the shroud gas comprises one or more of:

steam, $CO_2$, or other gases that participate in reactions with carbon within a gasifier or furnace.

* * * * *